United States Patent [19]

Milligan

[11] Patent Number: 4,707,340
[45] Date of Patent: Nov. 17, 1987

[54] STAGED GUIDE PLATE AND VESSEL ASSEMBLY

[76] Inventor: John D. Milligan, 650 Prospect Ave., Little Silver, N.J. 07739

[21] Appl. No.: 9,023

[22] Filed: Jan. 28, 1987

Related U.S. Application Data

[63] Continuation of Ser. No. 541,950, Oct. 14, 1983, abandoned.

[51] Int. Cl.⁴ ............................................. B01J 8/18
[52] U.S. Cl. .................... 422/140; 422/143; 422/220; 422/311; 261/114.5
[58] Field of Search ............. 422/140, 143, 220, 311; 208/108, 142, 143, 146, 153, 157; 261/114.1–114.5

[56] References Cited

U.S. PATENT DOCUMENTS

| | | | |
|---|---|---|---|
| 1,865,818 | 7/1932 | Berryman | 261/114 A X |
| 2,471,085 | 5/1949 | Wilcox et al. | 422/143 X |
| 2,876,079 | 3/1959 | Upchurch et al. | 422/143 |
| 3,197,286 | 7/1965 | Farkas et al. | 422/140 |
| 3,197,288 | 7/1965 | Johanson | 422/140 |
| 3,475,134 | 10/1969 | Weber et al. | 422/140 |
| 3,489,529 | 1/1970 | Dudych et al. | 422/311 X |
| 3,524,731 | 8/1970 | Effron et al. | 422/220 |
| 3,541,000 | 11/1970 | Hanson et al. | 208/108 |
| 4,126,539 | 11/1978 | Derr et al. | 208/108 |
| 4,135,885 | 1/1979 | Wormser et al. | 422/143 X |
| 4,330,505 | 5/1982 | Gupta | 422/217 |

Primary Examiner—David L. Lacey
Attorney, Agent, or Firm—Fred A. Wilson

[57] ABSTRACT

A staged distribution grid assembly and method for uniform fluid flow distribution upwardly into an ebullated catalyst bed of a reactor. In the staged grid assembly, the gas and liquid mixture flows first through a lower secondary flow distribution grid plate into an interim zone and then flows upwardly through an upper primary flow distribution grid plate into the reactor ebullated bed. The staged grid assembly contains an upper primary grid plate containing multiple flow tubes covered by bubble caps, and a lower secondary grid plate containing multiple flow tubes. The staged flow distribution grid assembly enables the primary grid to provide a more uniform distribution of gas and liquid flow upwardly into the ebullated bed across the entire cross-sectional area of the reactor, and thereby provides improved operation of the ebullated catalyst bed reactor.

14 Claims, 4 Drawing Figures

STAGED GUIDE PLATE AND VESSEL ASSEMBLY

This application is a continuation of application Ser. No. 541,950, filed Oct. 14, 1983, now abandoned.

BACKGROUND OF INVENTION

This invention pertains to an improved flow distribution grid plate assembly and method used for providing uniform upward fluid flow distribution in ebullated bed catalytic reactors. It pertains particularly to a staged flow distribution grid plate assembly having an upper primary grid plate and a lower secondary grid plate located and supported below the primary grid plate, each plate containing multiple vertical flow tubes.

In ebullated catalyst bed reactors operated at elevated temperature and pressure conditions, flow maldistribution problems sometimes exist below the distribution grid plate and in the catalyst bed above the grid plate. Such flow maldistribution is usually due to abnormal operating conditions such as plugging of openings in the grid plate by coke, or to excessive coke deposits on the catalyst particles in the bed. If such plugging of openings in the grid plate occurs, non-uniform flow distribution and bed ebullation results, which is very undesirable. The riser flow tubes and slotted tail pipes as now used in reactor grid plates usually perform adequately in distributing the recycle and feed liquid streams and hydrogen gas into the ebullated catalyst bed. However, the presently used grid plate arrangement has been found to be inadequate for handling severe flow maldistribution in the plenum of the reactor, for it can only moderately improve the flow distribution existing below the plate, but cannot alleviate "spouts" and major operational upset conditions which lead to an uneven depth of hydrogen in the plenum chamber, which can cause a greater length of the tail pipe slot to be exposed with a corresponding increase in hydrogen flow to those particular riser tubes. Such maldistribution flow conditions in a reactor plenum can be more or less constant depending on the manner in which the feed streams and recycle streams are introduced into the plenum. Also, flow maldistribution could possibly occur as a sloshing effect where the liquid level in the plenum below the distribution grid is constantly tilting from one direction to another.

The use in such ebullated bed catalytic reactors of conventional cylindrical riser flow tubes covered by cylindrical-shaped bubble caps is disclosed by U.S. Pat. No. 3,197,286 to Farkas et al; U.S. Pat. No. 3,197,288 to Johanson, and U.S. Pat. No. 3,475,134 to Weber et al. However, it has been found that inadequate distribution of the gas and liquid flows are usually provided by these reactor designs.

Accordingly, improvements in flow distribution in ebullated bed catalytic reactors have been sought. An improved staged grid plate configuration has now been developed which more effectively redistributes the gas and liquid flows below the primary grid plate whenever flow maldistribution problems exist below the grid plate, so as to provide more uniform ebullation of the catalyst bed in the reactor. To aid in maintaining a "smooth" liquid level in the plenum and consequently a reasonably equal length of slot exposure on each riser tube for gas flow into each tube, a secondary grid plate is provided below the primary grid plate. This secondary grid plate is similar to the single flow distribution grid presently used in ebullated bed reactors, however, the secondary grid does not have caps over the riser tubes on the upper side of the plate, but uses only slotted tubes attached to a plate which extends to near the inner walls of the reactor.

SUMMARY OF INVENTION

This invention provides a staged grid plate assembly and method used for improved flow distribution upwardly into a reactor vessel and preferably into an ebullated catalyst bed of a reactor vessel, in which a lower secondary flow distribution grid feeds gas and liquid flow upwardly to a upper primary flow distribution grid, and thence into the ebullated bed of the reactor. The flow tubes provided in the lower secondary grid plate are uniformly spaced and are relatively larger in diameter and have greater total cross-sectional area than flow tubes in the upper primary distribution grid, so that the greater and controlling pressure differential occurs across the upper primary grid plate to provide a more uniform flow distribution upwardly into the ebullated bed. This staged grid plate arrangement or assembly enables the upper primary grid to operate more effectively, so that the ebullated catalyst bed above the primary grid plate will have a more uniform distribution of gas and liquid flowing upwardly therethrough across the entire cross-sectional area of the reactor.

In the staged grid plate assembly of present invention, the upper primary grid plate can be supported from either the reactor lower head or from the reactor inner wall, and the lower secondary grid plate is usually supported from the upper primary grid, such as by multiple spacer rods extending between the two grids. Alternatively, the secondary grid plate can be separately supported from the reactor lower head or wall, or it can be structurally integrated with the primary upper grid plate so as to help withstand the total differential pressure across the grid plate assembly caused by the upward fluid flow through the grids. Also, the lower secondary grid plate can be attached integrally to the primary upper plate by an extension of the primary flow tubes below the upper plate and rigidly attached to the lower secondary plate, so that the catalyst bed weight and total pressure differential across both plates in the grid plate assembly is carried by the assembly. A particulate catalyst bed is preferably provided in the reactor vessel above the primary grid plate.

More specifically, the present invention comprises a staged grid plate assembly for providing uniform flow distribution of a gas/liquid mixture upwardly into an ebullated bed of a reactor, said grid plate assembly comprising an upper primary grid plate supported within the reactor near the lower end of the reactor, said primary grid plate containing multiple flow primary distribution tubes extending substantially vertically through said plate, said primary tubes being uniformly sized and spaced apart in the plate; a cap covering the upper end of each primary tube in said primary grid, said cap being rigidly attached to and spaced outwardly from the tube primary upper end above the grid plate, so as to permit flow of fluid upwardly through the tubes and then outwardly from under the lower edges of the cap into the ebullated bed; and a lower secondary grid plate located below and spaced from said primary grid plate, said secondary grid plate being supported within said vessel and containing multiple flow secondary distribution tubes passing substantially vertically through the secondary plate, said secondary tubes having uniform diameter and spacing, whereby fluid passes upwardly through the flow tubes in the secondary grid, and then upwardly through the flow tubes in the primary grid and outwardly from under the lower edges of the caps to provide uniform fluid flow in the reactor ebullated bed.

In another aspect of the invention, it comprises a method for uniformly distributing gas and liquid flow upwardly into an ebullated bed reactor, wherein the method comprises introducing gas and liquid flow streams into a plenum located at the lower end of a reactor below a flow distribution grid; passing said gas and liquid flow upwardly from said plenum through multiple tubular flow passages located in a secondary grid plate into an interim zone located above the secondary grid plate and below a primary grid plate; re-mixing and redistributing the gas and liquid flow in said interim zone above said lower grid plate; and passing the remixed gas and liquid upwardly through multiple tubular flow passages located in said upper primary grid plate, then under bubble caps each located over said multiple upper flow passages and uniformly into an ebullated catalyst bed of the reactor.

DESCRIPTION OF INVENTION

Figure 1:
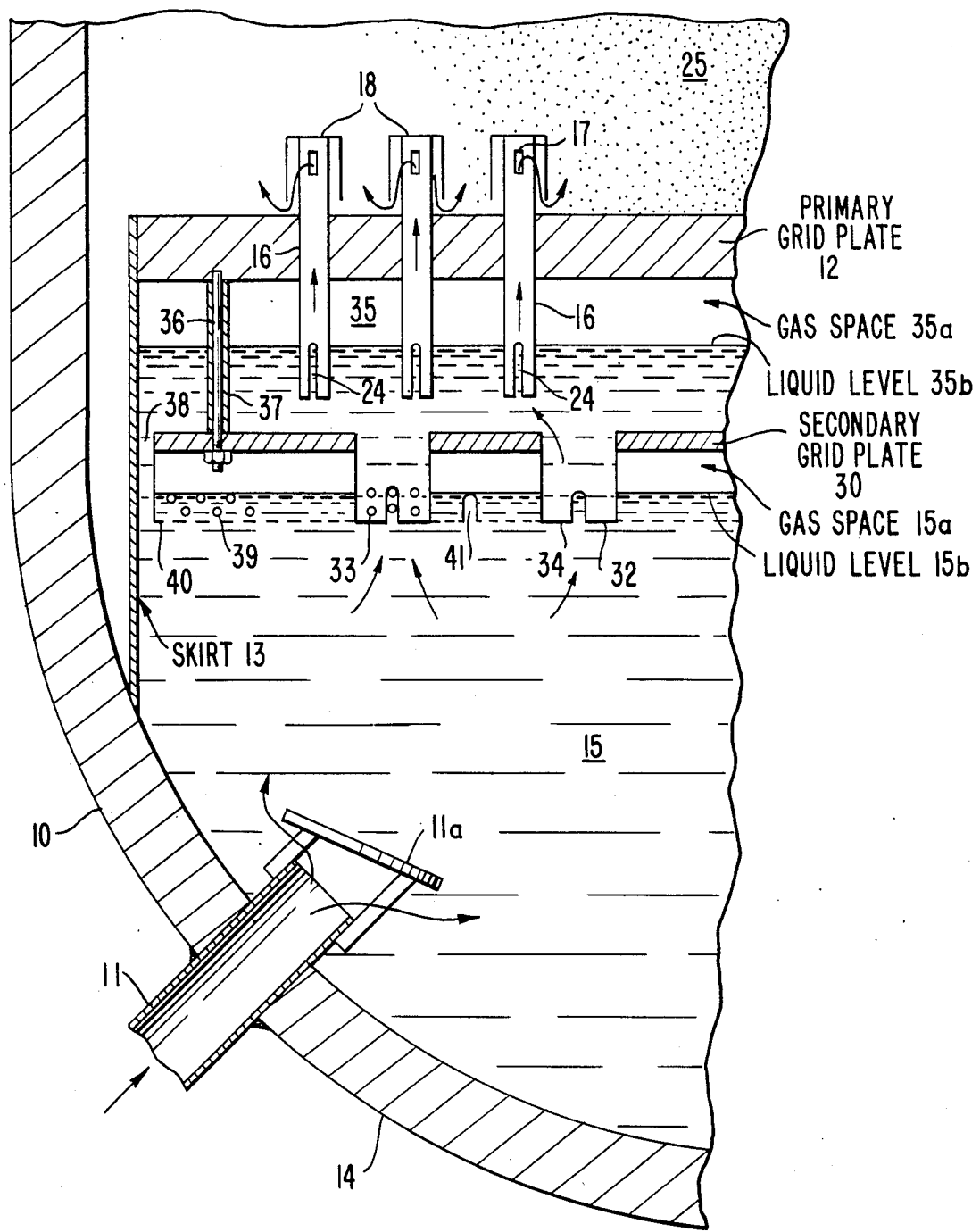
FIG. 1 shows a partial vertical sectional view through the lower portion of a reactor vessel containing a staged grid plate assembly having multiple riser tubes therein in accordance with the invention.

In liquid phase catalytic reactors for contacting liquids, gases and particulate solids, it is very important for achieving complete and effective catalytic reactions that the upflowing liquid and gas mixture be uniformly distributed across the entire horizontal cross-section of the reactor vessel, so as to maintain the bed of particulate solids or catalyst in a uniformly expanded condition with random motion of the catalyst. For certain reactions, such as the catalytic hydrogenation of heavy oils or coal-oil slurries or the hydrocracking of heavy hydrocarbon feedstreams at elevated temperature and pressure conditions, such as at 500°-1000° F. temperature and 500-5000 psig pressure, to produce lower-boiling liquid fractions, flow maldistribution through the reactor flow distributor or grid plate assembly can cause relatively inactive zones in the bed where the catalyst is not in uniform random motion. This condition leads to the undesired formation of agglomerates of catalyst particles by coking of the hot oil or slurry. The desired uniform flow distribution upwardly through the grid plate into the ebullated catalyst bed can be impaired either by restrictions occurring in the riser tubes due to coking, or by catalyst particles in the tubes. The present invention advantageously provides an effective solution to these flow maldistribution problems in the ebullated catalyst bed.

The flow distributor or grid plate assembly must also function to prevent catalyst particles from draining downwardly back through the distributor whenever the reactor is shutdown, while most of the liquid contained within the catalyst bed is drained down to below the bed. If catalyst is allowed to drain back through the grid plate flow distributor, it can plug the flow passages therein and interfere with operations so that re-ebullating the catalyst bed becomes very difficult because the flow passages are at least partly restricted. Furthermore, such restrictions can produce undesired flow maldistribution in the catalyst bed. To prevent such backflow of catalyst, a ball check valve is usually provided in each riser tube.

In the present invention, two grid plates are provided supported in a reactor vessel in series flow relationship so that a relatively more uniform flow distribution upwardly into the ebullated catalyst bed above the upper primary grid plate is thereby achieved. It is thus a basic feature of the present invention that both grid plates contain multiple flow tubes having uniform size and spacing, with only the tubes in the upper grid plate having caps covering the upper ends of the tubes. The flow tubes used in the secondary grid plate should be uniformly spaced apart and have relatively larger diameter and total cross-sectional area than the flow tubes in the upper primary grid plate. The secondary flow tubes do not necessarily need to by cylindrical in shape but can be square, rectangular, or triangular in cross-sectional shape or practically any configuration can be employed. However, the combination of tube effective diameter and number of tubes should provide the desired uniform flow and differential pressure across the secondary grid, which should be between about 0.10 and 0.90 times the differential pressure across the upper primary grid. Also, the length/diameter ratio for the secondary tubes should be at least about 1.0, and usually need not exceed about 5.0.

In operation, the gas liquid mixture which passes through the multiple flow tubes in the lower secondary grid is redistributed in the horizontal space between the two grid plates. Thus, the flow of gas/liquid mixture flowing through the multiple flow tubes in the upper primary grid into the ebullated bed will be more uniform than when only a single grid plate is used.

As generally shown in FIG. 1, reactor vessel 10 contains primary upper grid plate 12 which is rigidly supported therein usually at its outer edges by a cylindrical shaped support skirt 13 connected to the reactor lower head 14, and is sealed to the side wall in the lower portion of the reactor, so as to provide a plenum space 15 below a lower secondary grid plate 30. The feedstream to the reactor enters through conduit 11 and the flow is deflected radially outwardly by stationary baffle 11a. The upper primary grid plate 12 serves to support catalyst bed 25 and contains multiple riser flow tubes 16. As shown in greater detail in FIG. 2, each primary riser tube 16 has at least one opening or slot 17 at its upper end and is covered by a cap 18, which is rigidly attached to the upper end of tube 16 by suitable fastening means 19, such as a threaded bolt and nut. The lower end of cap 18 is spaced outwardly from tube 16 to provide for uniform flow of fluid upwardly through the tubes 16 and its slot 17 and into the bed 25 of catalyst particles.

Figure 2:
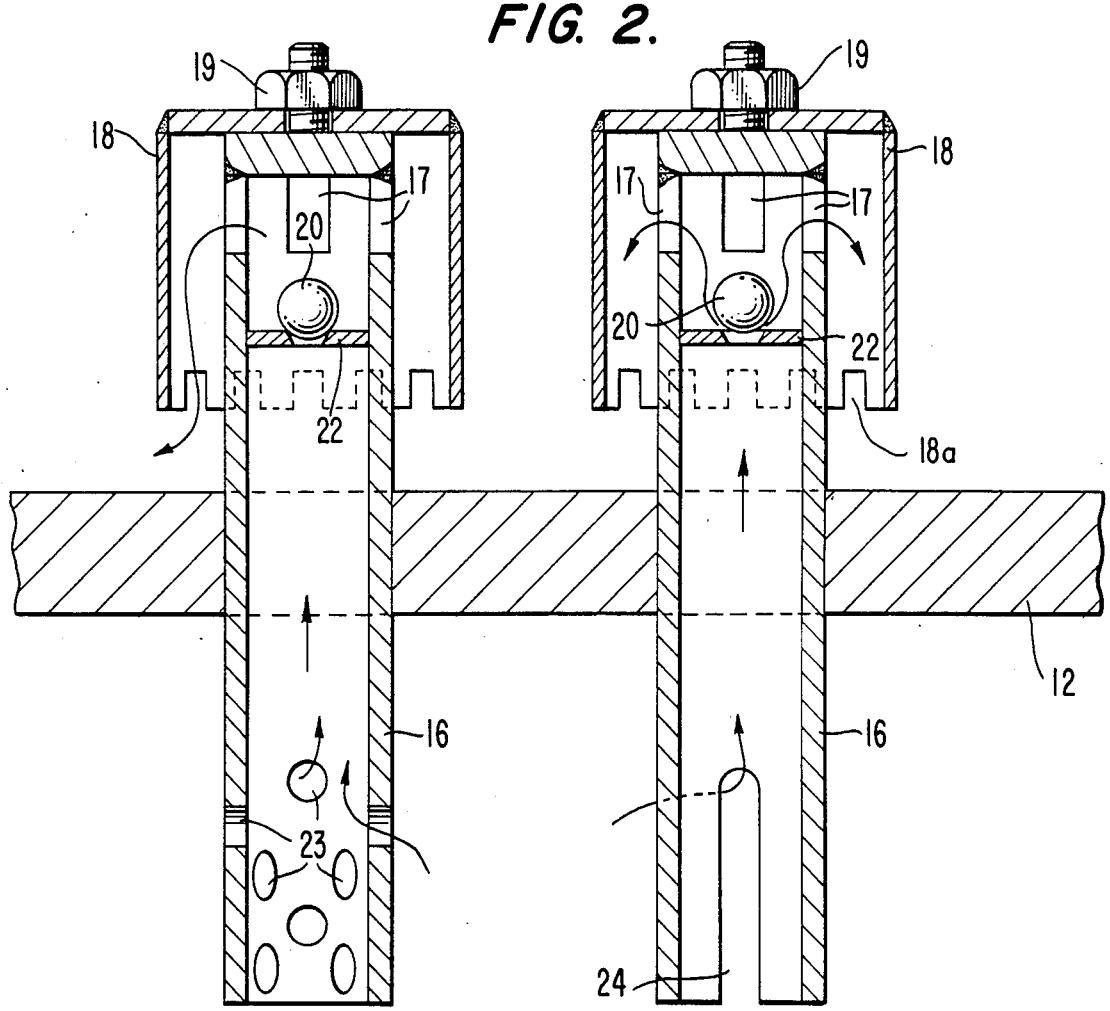
FIG. 2 shows a portion of the primary upper grid plate containing multiple riser flow tubes each covered by a single bubble cap and containing a ball check.

As shown in FIG. 2, the lower edge of the cap 18 is preferably provided with numerous notches 18a to provide for the localized exit flow of gas and promote the formation of small gas bubbles in bed 25. The notches are intended to let the gas emerge from under the caps 18 as small discrete bubbles instead of large globs of gas, and the notch widths should usually be 5~10 times the catalyst effective particle diameter. The notches located around the bottom of the caps can be used with individual caps of any shape, such as a cylindrical or tapered shape. Also to prevent backflow of catalyst from the bed 25 to plenum 15 below the grid plate following reactor shutdown or loss of recycle liquid flow, a ball check 20 is usually provided and is preferably located in the upper end of each riser tube 16, as shown in FIG. 2. The ball check 20 mates with seat 22 provided within the upper end of the riser tube 16 to prevent any backflow of catalyst from the bed 25 to the plenum 15 below the distributor plate 12. To facilitate the entry of gas such as hydrogen into the lower end of the riser tube 16, openings such as holes 23 or vertical slots 24 are provided in the tube below the grid plate 12.

Located below the primary grid plate 12 is a secondary grid plate 30, containing multiple parallel secondary flow tubes 32 each having opening such as holes 33 or vertical slot 34 in the lower end thereof. The secondary grid plate 30 is spaced below and usually supported from the upper grid plate 12, such as by multiple rods 36 with each rod having a spacer tube 37 located around the rod for maintaining the desired space 35 between the upper and lower grid plates, as shown in FIG. 1. The secondary grid 30 can be extended to contact support skirt 13, or preferably can have a small annular space 38 therebetween and be provided with a circumferential skirt 40 extending downwardly from plate 30. The lower end of skirt 40 should extend to substantially the same level as the lower ends of secondary flow tubes 32. Also, the skirt 40 is provided with openings such as holes 39 or slots 41, which are similar to holes 33 or slots 34 in the secondary flow tubes 32. Furthermore, the flow area of the annular space 38 should not exceed about 10 percent of the total flow area for the openings in the secondary grid plate, i.e. that provided both by multiple flow tubes 32 and annular flow space 38.

In operation of the dual grid plate assembly, the gas/liuid mixture fed into plenum 15 forms a gas space 15a below lower secondary grid plate 30 and above liquid level 15b. The gas and liquid mixture in plenum 15 passes upwardly through multiple flow tubes 32 and annular space 38 into space 35 between the upper and lower grid plates. In space 35, the gas/liquid mixture is redistributed generally horizontally and the gas portion rises to form gas space 35a above the liquid level 35b. The liquid level 35b is controlled by the vertical location of slots 24 in the lower ends of riser tubes 16 and by the flow rate through the grid plate.

It is thus an advantage of the present invention that the lower secondary grid plate provides for the lateral redistribution of fluid flow below the upper primary grid plate and thereby tends to correct any flow maldistribution below the primary grid plate, which may be caused by flow maldistribution problems on the underside of the grid. Reactor bed ebullation will be generally uniform unless some riser tubes become plugged by coke formation, etc.

Figure 3:
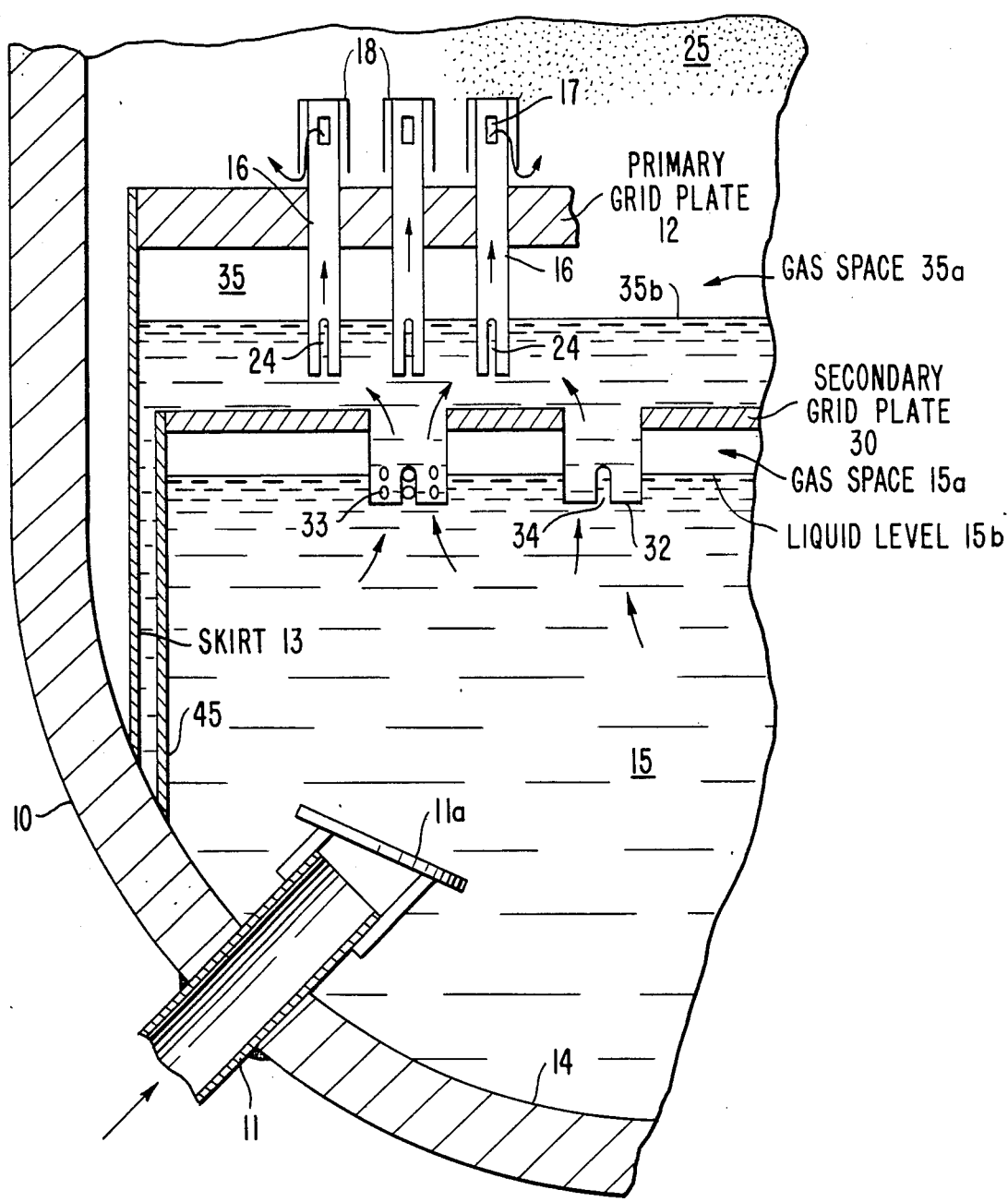
FIG. 3 shows a partial vertical sectional view of an alternative staged grid plate assembly in which both grid plates are supported from the reactor lower head.

In an alternative embodiment of the present invention, as shown in FIG. 3, both the upper primary grid plate 12 and the lower secondary grid plate 30 can be separately supported from the reactor lower head 14 by means of an outer cylindrical support skirt 13 for upper grid 12 and an inner cylindrical skirt 45 for supporting the lower grid plate 30. For this grid plate configuration, the support rods 36 and spacer tubes 37 used for the FIG. 1 embodiment are not needed. Also, the multiple flow tubes 32 in grid plate 30 are provided with multiple openings 33 or slots 34 to facilitate the entry of gas such as hydrogen into the flow tubes, similarly as for the flow tubes 16 in the upper grid plate 12. If desired, dual nozzles 11 for the reactor feedstream can be provided into plenum 15.

Figure 4:
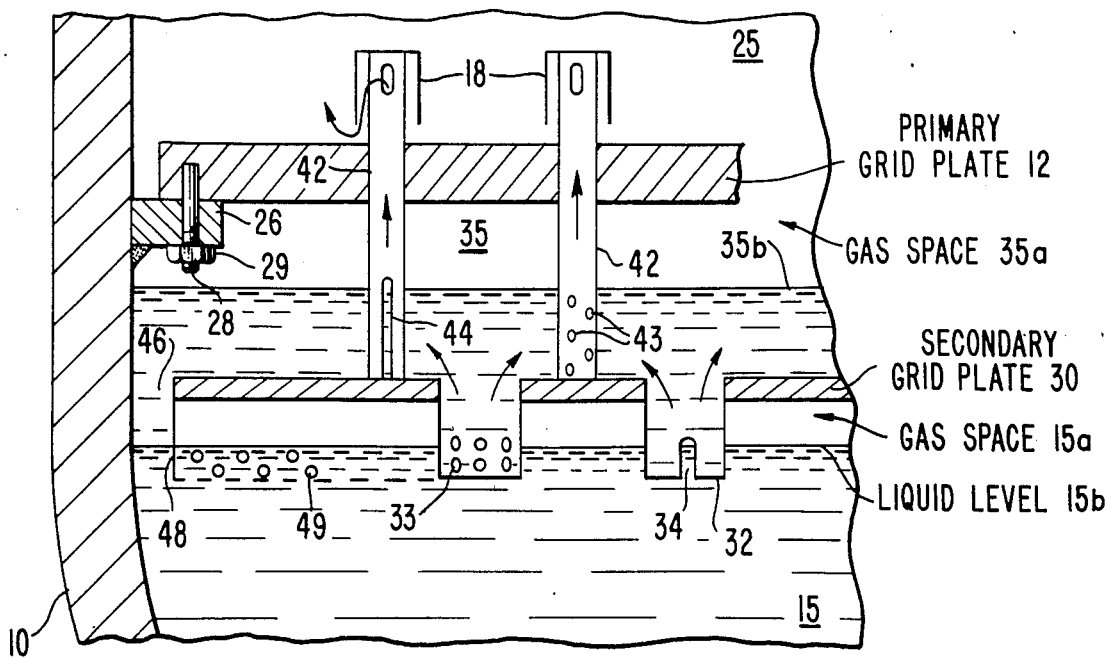
FIG. 4 shows a partial sectional view of an alternative grid plate assembly in which the staged grid plates are structurally integrated into a single unit supported from the reactor wall.

It is another important feature of the present invention that the two grid plates can be structurally integrated, so that the total pressure differential across the grid plate assembly due to upward fluid flow therethrough and the catalyst bed weight is carried by the assembly of both grid plates. As shown in FIG. 4, the riser tubes 42 for the primary upper grid plate 12 are extended downwardly and rigidly attached such as by welding to the lower secondary grid plate 30. Openings such as holes 43 or slots 44 are provided in the lower end of each tube 42 as before, to provide for entry of gas such as hydrogen into the flow tube. Also, the upper primary grid plate 12 can be suitably supported from the reactor inner wall by a continuous ring 26 welded to the wall. The upper grid plate 12 is attached to ring 26 by multiple fastener bolts 28 and nuts 29. In this grid plate assembly, the periphery of lower grid plate 30 can be extended to near the inner wall of reactor 10 so as to provide a small annular space 46 therebetween, and be provided with a peripheral depending skirt 48 and holes 49 similarly as previously described for the FIG. 1 embodiment.

The utility and effectiveness of the staged flow distribution grid assembly is illustrated by the following specific example, which should not be construed as limiting the scope of the invention.

EXAMPLE

In an ebullated bed catalytic hydrogenation reactor for petroleum feedstock material, a dual grid plate assembly provided near the reactor lower end has the following characteristics and dimensions:

| | |
|---|---|
| Reactor Temperature, °F. | 750–850 |
| Reactor Pressure, psig | 1000–3000 |
| Reactor Inside Diameter, ft | 12 |
| Vertical Spacing Between Primary and Secondary Grid Plates, in. | 16 |
| Primary Grid Flow Tube Diameter, in. | 1.30 |
| Bubble Cap Diameter, in. | 3 |
| Primary Flow Tube Extension Below Primary Grid Plate, in. | 9 |
| Flow Area of Primary Grid Tubes, in.$^2$ | 2.16 |
| Secondary Grid Flow Tube Diameter, in. | 4 |
| Secondary Flow Tube Extension Below Grid Plate, in. | 5 |
| Flow Area of Secondary Grid Tubes, in.$^2$ | 12.7 |
| Pressure Differential Across Upper Primary Grid, psi | 5–8 |
| Pressure Differential Across Lower Secondary Grid, psi | 1–3 |

During reactor operation the catalyst ebullation pattern in the reactor is uniform over a wide range of liquid and gas flow rates from the plenum upwardly into the reactor bed.

Although this invention has been described broadly and in terms of certain preferred embodiments thereof, it will be understood that modifications and variations to the apparatus can be made and that some elements can be used without others all within the spirit and scope of the invention, which is defined by the following claims.

I claim:

1. A staged grid plate and vessel assembly for providing uniform flow distribution of a gas/liquid mixture upwardly into the vessel, said assembly comprising:
    (a) a vessel lower portion having a side wall and a lower head attached to the wall;
    (b) an upper primary grid plate supported within said vessel lower portion, said primary grid plate containing multiple primary flow distribution tubes extending substantially vertically through said grid plate, said primary tubes being uniformly sized and spaced apart from each other in the grid plate;
    (c) a cap covering the upper end of each of said primary flow tubes in said primary grid plate, said cap having an upper end rigidly attached to each of said primary tubes at the tube upper end, said cap having a lower end, said lower end having an edge spaced outwardly from each of the tubes above the primary grid plate, so as to permit flow of a fluid upwardly through the primary tubes and then outwardly from under the lower end edges of the caps into the vessel above the primary grid plate; and
    (d) a lower secondary grid plate located below and spaced from said primary grid plate, said secondary grid plate being supported within said vessel lower portion and containing multiple flow secondary distribution tubes passing substantially vertically through the secondary plate, said secondary tubes being without caps and having uniform diameter and spacing, and having greater total cross-sectional area than the primary flow distribution tubes in said primary grid plate, wherein the secondary tubes each have larger cross-sectional area than each primary tube in the primary grid plate, said secondary grid plate being spaced below and supported from said primary grid plate by multiple support rods attached to the primary and secondary grid plates; said vessel lower portion has a feed stream inlet positioned below said secondary grid plate whereby fluid passes first upwardly through the secondary flow tubes in the secondary grid plate and then directly upwardly through the primary flow tubes in the primary grid plate and outwardly from under the lower edges of the caps to provide uniform fluid flow into the vessel.

2. An assembly according to claim 1, wherein the primary tubes each contain a check valve to prevent backflow of catalyst from above the primary grid plate to below the primary grid plate, said check valve being a ball and a mating seat located in the upper portion of the primary tubes.

3. An assembly according to claim 1, wherein an annular space is defined between said lower secondary grid plate and said side wall of the vessel, and a circumferential skirt having openings therein extends downwardly from said secondary grid plate, whereby the fluid passes upwardly through said skirt openings and through said annular space.

4. A staged grid plate and vessel assembly for providing uniform flow distribution of a gas/liquid mixture upwardly into the vessel, said assembly comprising:
    (a) a vessel lower portion having a vertical side wall and a lower head attached to the wall;
    (b) an upper primary grid plate supported within said vessel lower portion, said primary grid plate containing multiple uniformly spaced primary flow distribution tubes extending substantially vertically through said plate, said primary tubes being uniformly sized and spaced apart in the plate;
    (c) a cap covering the upper end of each of said primary flow tubes in said primary grid plate, said cap having an upper end rigidly attached to each of said primary tubes at the tube upper end, said cap having a lower end and said lower end having an edge spaced outwardly from the tubes above the primary grid plate, so as to permit flow of a fluid upwardly through the primary tubes and then outwardly from under the lower end edge of the caps into the vessel above the primary grid plate; and
    (d) a lower secondary grid plate located below and spaced from said primary grid plate, said secondary grid plate being rigidly supported within said vessel lower portion and containing multiple flow secondary distribution tubes having uniform size and spacing and passing substantially vertically through the secondary grid plate, said secondary tubes in the secondary grid plate being without caps and having uniform diameter and spacing and having greater total cross-sectional area than the primary flow tubes in said primary grid plate, wherein both said primary and secondary grid plates are structurally integrated by said primary tubes being rigidly attached at their lower ends to the secondary grid plate so as to withstand the total differential pressure across the grid plates, said lower ends of said primary tubes having openings therein to permit fluid to flow into said primary tubes, said vessel lower portion has a feed stream inlet positioned below said secondary grid plate whereby fluid passes first upwardly through the secondary tubes in the secondary grid plate, and then directly upwardly through the primary flow tubes in the primary grid plate and outwardly from under the lower edges of the caps to provide uniform fluid flow in the vessel.

5. A staged grid plate and reactor assembly for providing uniform flow distribution of a gas/liquid mixture upwardly into an ebullated catalyst bed of the reactor, said assembly comprising:
    (a) a reactor having a cylindrical side wall and a lower head rigidly attached to said wall and containing a catalyst bed located within an upper portion the reactor;
    (b) an upper primary grid plate supported within said reactor near a lower end of the reactor, said primary grid plate containing multiple primary flow distribution tubes extending substantially vertically through said primary plate, said primary tubes being uniformly sized and spaced apart in the primary plate;
    (c) a cap covering the upper end of each of said primary flow tubes in said primary grid plate, said cap having an upper end rigidly attached to each of said primary flow tubes at the tube upper end, said cap having a lower end and said lower end having an edge spaced outwardly from the primary tubes above the primary grid plate, so as to permit flow of a fluid upwardly through the primary tubes and then outwardly from under the lower end edges of the caps into the reactor ebullated catalyst bed; and
    (d) a lower secondary grid plate located below and spaced from said primary grid plate, said secondary grid plate being rigidly supported within said reactor and containing multiple secondary flow distribution tubes passing substantially vertically through the secondary grid plate, said secondary flow tubes in the secondary grid plate being without caps and having uniform diameter and spacing and having greater total cross-sectional area than the primary flow distribution tubes in said primary grid plate, wherein the secondary tubes each have larger cross-sectional flow area than each of said primary tubes in the primary grid plate, said vessel lower portion has a feed stream inlet positioned below said secondary grid plate whereby fluid passes first upwardly through the secondary flow tubes in the secondary grid plate, and then upwardly through the primary flow tubes in the primary grid plate and outwardly from under the lower edges of the caps to provide uniform fluid flow into the reactor ebullated catalyst bed, so that uniform fluidization of catalyst occurs in the reactor above said upper primary grid plate.

6. A grid plate and reactor assembly according to claim 5, wherein said tubes in said lower secondary grid plate have a length effective diameter ratio from about 1.0 to about 5.0.

7. A grid plate and reactor assembly according to claim 5, wherein said secondary grid plate is supported from said primary grid plate by multiple support rods and spaced below said primary grid plate by a spacer means provided on said support rods.

8. A grid plate and reactor assembly according to claim, 5, wherein said primary grid plate is sealably attached to the reactor lower head by a cylindrical skirt means extending below said primary grid plate to an attachment point below said secondary grid plate.

9. A grid plate and reactor assembly according to claim 5, wherein both said primary and secondary grid plates are structurally integrated by said primary tubes being rigidly attached at their lower ends to said secondary grid plate so as to withstand the catalyst bed weight and the total differential pressure across the grid plates, said lower ends of said primary tubes having openings therein to permit fluid to flow into said primary tubes.

10. A grid plate and reactor assembly according to claim 5, wherein the primary tubes each contain a check valve to prevent backflow of catalyst from above the primary grid plate to below the primary grid plate, said check valve being a ball and a mating seat located in the upper portion of the primary tubes.

11. A staged grid plate and reactor assembly according to claim 5, wherein an annular space is defined between said lower secondary grid plate and the side wall, and a circumferential skirt having openings therein extends downwardly from said secondary grid plate, wherein the flow area of said annular space does not exceed about 10 percent of the combined cross-sectional flow area for the openings in the secondary tubes and said annular space around said secondary grid plate, whereby the gas/liquid mixture passes upwardly through said skirt openings and through said annular space.

12. A grid plate and reactor assembly according to claim 5, wherein said primary flow tubes are extended downwardly and are rigidly attached to the lower secondary grid plate so as to support the lower grid plate, and openings are provided in the lower end wall of each of said primary flow tubes to provide for entry of fluid into the primary tubes.

13. A staged grid plate and reactor assembly for providing uniform flow distribution of a gas/liquid mixture upwardly into an ebullated catalyst bed of the reactor, said assembly comprising:

(a) a reactor having a cylindrical wall and a lower head rigidly attached to said wall, and containing a catalyst bed within an upper portion of the reactor;

(b) an upper primary grid plate supported within the reactor near a lower end of the reactor, said primary grid plate containing multiple uniformly spaced primary flow distribution tubes extending substantially vertically through said plate, said primary tubes being uniformally sized and spaced apart in the primary plate;

(c) a cap covering the upper end of each of said primary flow tubes in said primary grid plate, said cap having an upper end rigidly attached to each of said primary flow tube at the tubes upper end, said cap having a lower end and said lower end having an edge spaced outwardly from the primary flow tubes above the primary grid plate, so as to permit flow of fluid upwardly through the primary tubes and then outwardly from under the lower end edge of the caps into the ebullated bed; and (d) a lower secondary grid plate located below and spaced from said primary grid plate, said secondary grid plate being rigidly supported within the reactor and containing multiple secondary flow distribution tubes having uniform size and spacing and passing substantially vertically through the secondary grid plate, said secondary flow tubes in the secondary grid plate being without caps and having uniform diameter and spacing and having greater diameter and total cross-sectional area than the primary flow distribution tubes in the primary grid plate, said secondary flow tubes having a length/effective diameter ratio from about 1.0 to about 5.0, wherein the secondary tubes each have larger cross-sectional area than each of said primary tubes in the primary grid plate, said vessel lower portion has a feed stream inlet positioned below said secondary grid plate whereby fluid passes first upwardly through the secondary flow tubes in the secondary grid plate, and then upwardly through the primary flow tubes in the primary grid plate and outwardly from under the lower edges of the caps to provide uniform fluid flow in the reactor ebullated catalyst bed, so that uniform fluidization of the catalyst bed occurs in the reactor above said upper primary grid plate.

14. A staged grid plate and vessel assembly for providing uniform flow distribution of a gas/liquid mixture upwardly into a the vessel, said assembly comprising:

(a) a vessel lower portion having a sidel wall and a lower head attached to the wall:

(b) an upper primary grid plate supported withing said vessel lower portion, said primary grid plate being sealably attached to the vessel lower head by a cylindrical skirt extending below said primary grid plate to an attachment point on the vessel lower head, said primary grid plate containing multiple primary flow distribution tubes extending substantially vertically through said plate, said primary tubes being uniformaly sized and spaced apart from each other in the primary grid plate;

(c) a cap covering the upper end of each of said primary flow tubes in said primary grid plate, said cap having an upper end rigidly attached to each of said primary tubes at the tube upper end, said cap having a lower end and said lower end having an edge spaced outwardly from the primary flow tubes above the primary grid plate, so as to permit flow of a fluid upwardly through the primary tubes and then outwardly from under the lower end edges of the caps into the reactor vessel above the primary grid plate; and (d) a lower secondary grid plate located below and spaced from said primary grid plate and attached to the vessel lower head, said secondary grid plate being supported within said vessel lower portion and containing multiple flow secondary distribution tubes passing substantially vertically through the secondary grid plate, said secondary tubes being without caps and having uniform diameter and spacing, said secondary tubes having greater total cross-sectional area than the primary flow distribution tubes in said primary grid plate, wherein the secondary tubes each have larger cross-sectional area than each of said primary tubes in the primary grid plate, said vessel lower portion has a feed stream inlet positioned below said secondary gride plate whereby fluid passes first upwardly through the secondary flow tubes in the secondary grid plate and then directly upwardly through the primary flow tubes in the primary grid plate and outwardly from under the lower edges of the caps to provide uniform fluid flow in the vessel.

* * * * *